United States Patent
De Blasio (10) Patent No.: US 11,535,111 B2
(45) Date of Patent: Dec. 27, 2022

(54) MOBILE CHARGING UNIT, PARTICULARLY FOR ELECTRIC VEHICLES, AND A MANAGEMENT SYSTEM THEREOF FOR THE DELIVERY OF CHARGES ON REQUEST

(71) Applicant: E-GAP S.R.L., Rome (IT)

(72) Inventor: Eugenio De Blasio, Rome (IT)

(73) Assignee: E-GAP S.R.L., Rome (IT)

( * ) Notice: Subject to any disclaimer, the term of this patent is extended or adjusted under 35 U.S.C. 154(b) by 212 days.

(21) Appl. No.: 16/635,727

(22) PCT Filed: Aug. 2, 2018

(86) PCT No.: PCT/IT2018/050145
§ 371 (c)(1),
(2) Date: Jan. 31, 2020

(87) PCT Pub. No.: WO2019/026095
PCT Pub. Date: Feb. 7, 2019

(65) Prior Publication Data
US 2021/0129695 A1 May 6, 2021

(30) Foreign Application Priority Data
Aug. 3, 2017 (IT) .......................... 102017000089301

(51) Int. Cl.
*B60L 53/30* (2019.01)
*B60L 53/68* (2019.01)
(Continued)

(52) U.S. Cl.
CPC ............. *B60L 53/305* (2019.02); *B60L 53/62* (2019.02); *B60L 53/665* (2019.02); *B60L 53/68* (2019.02);
(Continued)

(58) Field of Classification Search
CPC .... H02J 2310/12; H02J 2310/48; H02J 7/342; H02J 7/0027; Y02T 10/70;
(Continued)

(56) References Cited

U.S. PATENT DOCUMENTS 9,887,570 B2 * 2/2018 Johnsen .................. B60L 1/006
9,912,017 B1 * 3/2018 Kuo ..................... H01M 10/441
(Continued)

FOREIGN PATENT DOCUMENTS

EP 2875985 A1 * 5/2015 ............ B60L 11/005
KR 20150109608 A * 3/2014 .............. B60L 11/18
(Continued)

OTHER PUBLICATIONS

International Search Report dated Jan. 16, 2019 from corresponding PCT Application No. PCT/IT2018/050145.
(Continued)

*Primary Examiner* — Helen Rossoshek
(74) *Attorney, Agent, or Firm* — Innovation Capital Law Group, LLP; Vic Lin (57) ABSTRACT

This invention relates to a mobile charging unit (1), particularly for one or more electric vehicles (4), of the type including rechargeable batteries (41), comprising a mobile charging vehicle (2), and a charging apparatus (3), installed on said charging vehicle (2), having, in turn: an energy accumulation group (5), equipped with accumulators (51) for containing energy for charging said electric vehicles (4); an inverter (6), connected to said accumulators (51), comprising a DC-AC-DC converter (62) to convert the direct current coming from said accumulators (51) into alternating current, wherein said inverter (6) is connectable to an alternating current network (9) and is adapted to transform the alternating current of said alternating current network (9) into direct current for charging said accumulators (51); and
(Continued)

an internal control system (7), connected to said inverter (6), adapted to control the operation of said inverter (6); said charging apparatus (3) is characterised in that said inverter (6) further comprises a direct current bus (63), connected to said DC-AC-DC converter (62), and a DC-DC converter (61), from direct current into direct current, connected to said direct current bus (63) and connectable to the rechargeable batteries (41) of said vehicle (4). This invention also relates to a method (200) for selecting a mobile charging unit (1) and a management system (100) for managing a mobile charging unit (1), the accumulated energy and the delivery of charges on request.

5 Claims, 6 Drawing Sheets

(51) Int. Cl.
*B60L 53/62* (2019.01)
*B60L 53/66* (2019.01)

(52) U.S. Cl.
CPC ....... *B60L 2240/70* (2013.01); *B60L 2250/16* (2013.01)

(58) Field of Classification Search
CPC ..... Y02T 10/7072; Y02T 10/72; Y02T 90/12; Y02T 10/92; Y02T 90/01; B60L 53/30; B60L 53/305; B60L 53/60; B60L 53/62; B60L 53/665; B60L 2240/70; B60L 2240/72; B60L 53/68; B60L 53/11; B60L 53/18; B60L 55/00; B60L 53/80; B60L 2200/18; B60L 2250/16; B60L 50/60
See application file for complete search history.

(56) References Cited

U.S. PATENT DOCUMENTS

| | | | |
|---|---|---|---|
| 2004/0130292 A1 | 7/2004 | Buchanan et al. | |
| 2012/0025763 A1* | 2/2012 | Hsiao | B60L 53/14 320/109 |
| 2012/0229086 A1* | 9/2012 | Chi | H02J 3/1842 320/109 |
| 2012/0299531 A1 | 11/2012 | Prosser et al. | |
| 2013/0020993 A1 | 1/2013 | Taddeo et al. | |
| 2014/0021917 A1 | 1/2014 | Paupert | |
| 2014/0188318 A1 | 7/2014 | Langgood et al. | |
| 2015/0258902 A1* | 9/2015 | Fietzek | B60L 55/00 307/9.1 |
| 2019/0272600 A1* | 9/2019 | Lin | B60L 53/68 |
| 2019/0393709 A1* | 12/2019 | Haase | H02J 7/0047 |
| 2021/0009006 A1* | 1/2021 | Gaze | B60K 1/04 |

FOREIGN PATENT DOCUMENTS

| | | | | |
|---|---|---|---|---|
| KR | 1957721 B1 * | 3/2019 | ............. | B60L 53/20 |
| KR | 2021130975 A * | 11/2021 | | |
| WO | 2011108925 A2 | 9/2011 | | |

OTHER PUBLICATIONS

Italian Search Report dated Mar. 1, 2018 from Italian Application No. IT 201700089301.

* cited by examiner

MOBILE CHARGING UNIT, PARTICULARLY FOR ELECTRIC VEHICLES, AND A MANAGEMENT SYSTEM THEREOF FOR THE DELIVERY OF CHARGES ON REQUEST

A mobile charging unit, particularly for electric vehicles, and a management system thereof for the delivery of charges on request.

This invention relates to a mobile charging unit for electric vehicles and a management system thereof for the delivery of charges on request.

More specifically, the invention relates to a unit of the type mentioned, integrated into a management system that has been designed and created to allow the charging of any type of electric vehicle located in any place, allowing for a rapid charge.

In the following the description will be addressed to the charging of electric cars, but it is quite evident that the same should not be considered limited to this specific use.

As is well known, electric cars are currently becoming increasingly widespread in the market.

This need is especially due to the fact that on the one hand, the pollution of large cities has entailed the reduction of the local circulation of internal combustion cars, and on the other hand, the technology of electric cars has finally become usable for everyday needs.

In fact, electric cars are currently equipped with batteries capable of having a sufficient duration to allow travel of a medium/long duration with reduced distances, if compared to internal combustion vehicles.

In addition, the price of electric cars has greatly reduced. There are now many car manufacturers who are heavily investing in the development of electric cars. Consequently, electric vehicles will be increasingly available in the future.

A currently existing problem which in some way limits the diffusion of electric vehicles is the fact that energy distributors for charging said vehicles are not yet widespread in both cities and outside of cities.

In particular, there are still substantially few and therefore distant charging stations for electric vehicles in cities.

It is clear how this limit does not allow a more rapid diffusion of electric vehicles, which would instead be, as mentioned above, a good solution to the problem of pollution.

In light of the above, an object of this invention is therefore to propose a mobile charging system for electric vehicles which is flexible and makes it possible to charge different types of electric vehicles quickly, allowing adequate energy storage.

Another object of this invention is to propose a circuit diagram that allows more rapid charging of electric vehicles, so as to allow the creation of mobile charging services, so as to overcome the shortcomings of fixed charging columns, thereby facilitating the diffusion of electric vehicles.

The subject of this invention is a mobile charging system and a management system for delivering charges on request as in the appended claims, included here for reference.

Therefore, the specific subject of this invention is a mobile charging unit, particularly for one or more electric vehicles, of the type including rechargeable batteries, comprising a mobile charging vehicle, and a charging apparatus, installed on said charging vehicle, having, in turn: an energy accumulation group, equipped with accumulators for containing the energy for charging said electric vehicles; an inverter, connected to said accumulators, comprising a DC-AC-DC converter for converting the direct current coming from said accumulators into alternating current, wherein said inverter is connectable to an alternating current network and is adapted to transform the alternating current of said network into alternating current into direct current for charging said accumulators; and an internal control system, connected to said inverter, adapted to control the operation of said inverter; said charging apparatus is characterised in that said inverter further comprises a direct current bus, connected to said DC-AC-DC converter, and a DC-DC converter, from direct current into direct current, connected to said direct current bus and connectable to the rechargeable batteries of said vehicle.

Always according to the invention, said inverter can comprise one or more switches, interposed between said direct current bus and said accumulators, said switches being connected to said internal control system.

Still according to the invention, said internal control system may comprise: an interface panel visible by means of a display, preferably a touch screen display, to highlight charging parameters such as kWh delivered, estimated charging end time, instantaneous power, and an interface board, intended to be connected, by means of a cable, to an analogous communication interface board of said electric vehicle whose rechargeable batteries must be charged, for detecting the charge state of said rechargeable batteries, said interface board being adapted to detect the operational information of said charging apparatus including: information relating to the electric charge and the temperature of said accumulators and related to the thermal and operating condition of said inverter.

Advantageously according to the invention, said accumulators can be arranged in a rack configuration.

Further according to the invention, said unit can include a detection board for detecting the charge and discharge state of said accumulators, said detection board being connected to said internal control system and being configured to provide operating variables of said accumulators to said internal control system.

Preferably according to the invention, said unit can comprise connectors for connecting said inverter to said rechargeable batteries of said vehicle.

A further object of this invention is a method for selecting a mobile charging unit as defined above, comprising the following steps: A. provide a main control server; B. provide one or more service peripherals, such as a smartphone or tablet, each associated with the driver of one of said charging vehicles of said mobile charging units, in which each service peripheral is configured to acquire data relating to the charge state of said energy accumulation group of the respective mobile charging unit and is able to detect its geolocation parameters; C. provide transceiver devices, each associated with a user interested in charging a respective electric vehicle, able to detect the geolocation parameters; D. transmit by a user by means of said transceiver devices to said main control server a request for the electrical charging of the respective electric vehicle, also transmitting the respective geolocation parameters; E. by means of said main control server, select one of the mobile charging units for charging the electric vehicle associated with said transceiver devices of said step D, on the basis of the geolocation parameters of said transceiver devices and said one or more service peripherals and the charge state of the energy accumulation groups of each mobile charging unit; F. charge the electric vehicle which is associated with said requesting transceiver devices of said step D, drawing energy from said energy accumulation group, through said DC-DC converter and/or said DC-AC-DC converter and said direct current bus.

Always according to the invention, said transceiver devices can comprise one or more access peripherals such as smartphones and the like, each associated with a user interested in charging a respective electric vehicle and able to detect the geolocation parameters.

Still according to the invention, said step E can further comprise the following step: determine the geographical position of each mobile charging unit, so as to select the service vehicle and the optimal route for the charging order received in said step D.

Advantageously according to the invention, said step E can further comprise the following steps: check the availability of the charging vehicle selected, if it is able to reach the customer within the requested time; if the charging vehicle is available, evaluate the charge state of the charging apparatus installed on the identified available charging vehicle; detect the availability in remaining working hours of the driver of the charging vehicle of the identified available mobile charging unit, determining and also taking account of the energetic autonomy of said charging vehicle to later return to a charging station; check, by said main control unit, if all the requirements have been met by selecting which mobile charging unit, with respect to the request received in said step D, is capable of supplying the charge; assign the order to a mobile charging unit, by means of said main control server, on the basis of the geographical position of the requests received by said transceiver devices, as a result of the calculation of the optimal route; and do not confirm the charging operation in the case of said step whereby no mobile charging unit is available, or said step whereby the necessary requirements for a charge were no met in terms of available charging capacity and working hours of the drivers of the service vehicle, for the mobile charging unit near the electric vehicle associated with said access peripheral of said step D.

Always according to the invention, said geolocation parameters can comprise latitude and longitude in decimal degrees/GMS degrees, minutes, seconds.

Still according to the invention, said transceiver means can comprise one or more user data control units, each associated with an electric vehicle to be charge capable to detecting the geolocation parameters and the charge state of the rechargeable batteries of said electric vehicle and of performing said step D when said charge state of said rechargeable batteries falls below a predefined threshold.

Another specific object of this invention is a management system for managing mobile charging units, comprising one or more mobile charging units as defined above, a main control server, one or more service peripherals such as a smartphone or tablet, in which each service peripheral is associated with the driver of said charging vehicles of said mobile charging units, on which said charging apparatuses are installed, in which each service peripheral is operatively connected to said internal control system, for the acquisition of data relating to the charge state of said energy accumulation group, and in which each service peripheral is equipped with geolocation means for detecting geolocation parameters of the service peripheral itself, in which each of said service peripherals is operatively connected to said main control server, for the transmission to said main control server of said geolocation parameters of the service peripheral and of said data relating to the charge state of said energy accumulation group, and one or more transceiver devices, each equipped with geolocation means, for detecting the geolocation parameters of said transceiver device, in which each transceiver device is associated with a user interested in charging the respective electric vehicle, wherein each of said transceiver devices is operatively connected to said main control server for the transmission of said geolocation parameters of the respective transceiver device, wherein said main control server is configured to perform the method as defined above.

Always according to the invention, said transceiver devices comprise one or more access peripherals such as smartphones and the like, each associated with a user interested in charging a respective electric vehicle and able to detect geolocation parameters.

Still according to the invention, said system can comprise a control unit for collecting data to collect the data of charging vehicles of said mobile charging units, connected to said main control server, a module for online payments, connected to said main control server, wherein said main control server allows the execution of an online payment on the basis of the data stored in said control unit for collecting data.

Advantageously according to the invention, said system can comprise a connection module for roadside assistance, connected to said main control server, to call roadside assistance if a charging vehicle or electric vehicle has an emergency.

Further according to the invention, said system can comprise a cloud server for saving data, connected to said main server, equipped with a back-up module.

Preferably according to the invention, said transceiver devices can comprise one or more user data control units, each directly or indirectly connected to the detection board of the respective electric vehicle to be charged able to detect the geolocation parameters and the charge state of said rechargeable batteries of the respective electric vehicle, in which each of said user data control units is operatively connected to said main control server for the transmission of said geolocation parameters of the respective access peripheral and of a charging order when said charge state of said rechargeable batteries falls below a predefined threshold.

This invention will now be described for illustrative, but not limited to, purposes, according to its preferred embodiments, with particular reference to the figures of the accompanying drawings, wherein.

In the various figures, similar parts will be indicated with the same reference numbers.

Figure 1:
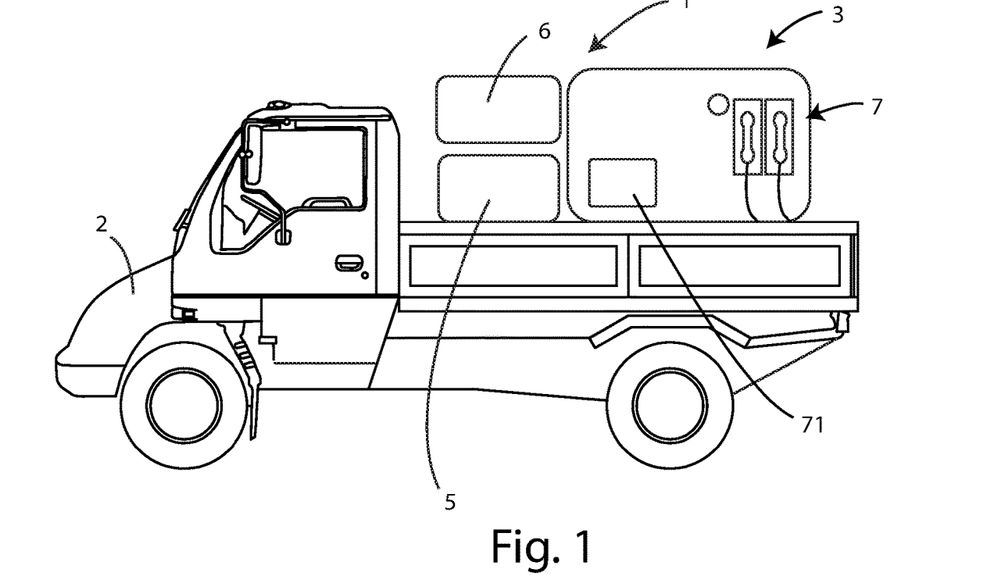
FIG. 1 shows a schematic view of the mobile charging unit according to this invention.
Figure 2:
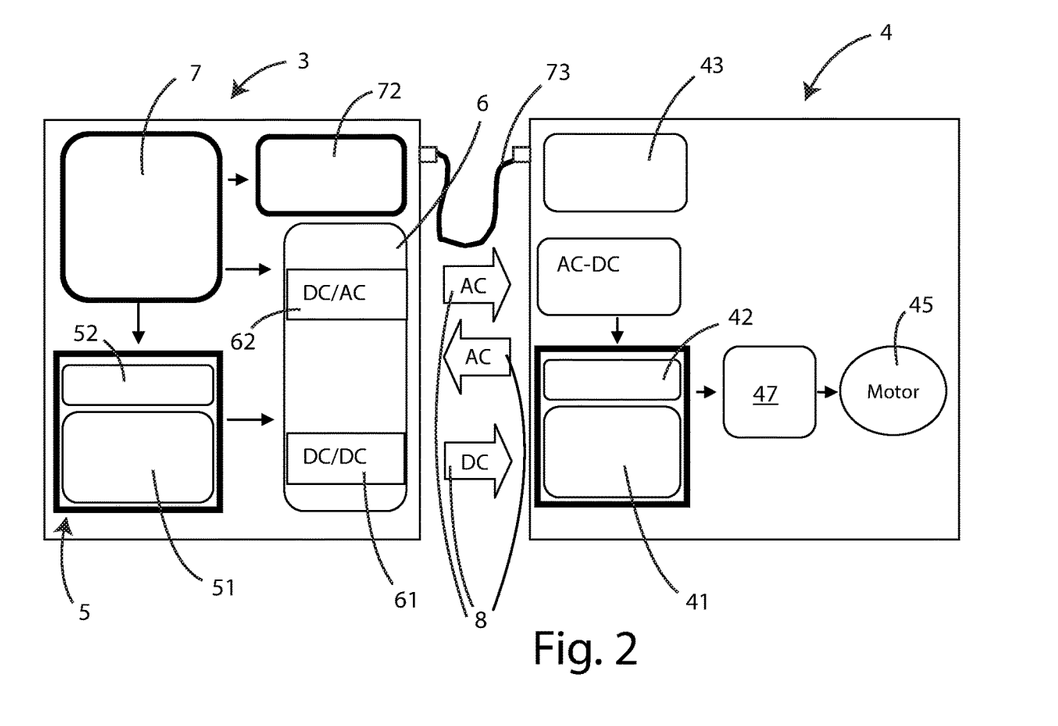
FIG. 2 shows a block diagram of the mobile charging system of the mobile charging unit of FIG. 1, connected to an electric vehicle to be charged.

With reference to FIGS. 1 and 2, the mobile charging unit 1 according to this invention can be observed.

The mobile charging unit 1 essentially comprises a charging vehicle 2 and a charging apparatus 3, installed on said charging vehicle 2, so as to reach different electric vehicles 4 to supply and charge.

In particular, said charging apparatus 3 comprises an energy accumulation group 5, an inverter 6, an internal control system 7 and connectors 8.

The energy accumulation group 5 comprises a plurality of batteries or accumulators 51 and a detection board 52, adapted to control the charge and discharge states of the accumulators 51, providing operating variables of the accumulators 51 to the internal control system 7 to which it is connected.

The inverter 6 is connected to said energy accumulation group 5, which is also installed on said charging vehicle 2.

The inverter 6 comprises a DC-DC converter 61, i.e. from direct current into direct current, and a DC-AC-DC 62, i.e. from direct current into alternating current and vice versa.

The inverter 6 manages the power of the energy flow for charging vehicle accumulators, as better explained in the following.

In other words, the inverter 6 is the responsible part, in accordance with needs, for providing energy to the load (the electric vehicle 4).

The inverter 6 is of the bidirectional type and is adapted to perform the following functions:
- transform the direct current delivered from the system's batteries, into alternating current with an industrial voltage adapted to supply the battery chargers of the electrical vehicles 4 to be charged (charging in mode 1, 2 and 3, type 1, 2 and 3 according to IEC standard 61851-1);
- manage the direct current and the charging voltage of the system for the direct charging in DC of the batteries of the electrical vehicles 4 to be charged (charging in mode 4, type CHAdeMO and CCS Combo, according to IEC standard 61851-1);
- become, or operate, as a battery charger when it is connected to the network 9 to charge the accumulators 51, reversing its function and transforming the AC current into DC current.

All these functions integrated in the same component make it possible to lower the weight and amount of components in all equipment.

A multiple switch 67 is also envisaged, coordinated such that the system can selectively charge the accumulators 51 or through the network 9, or charge the rechargeable batteries 41 of an electric vehicle 4, in direct current or alternating current.

Figure 3:
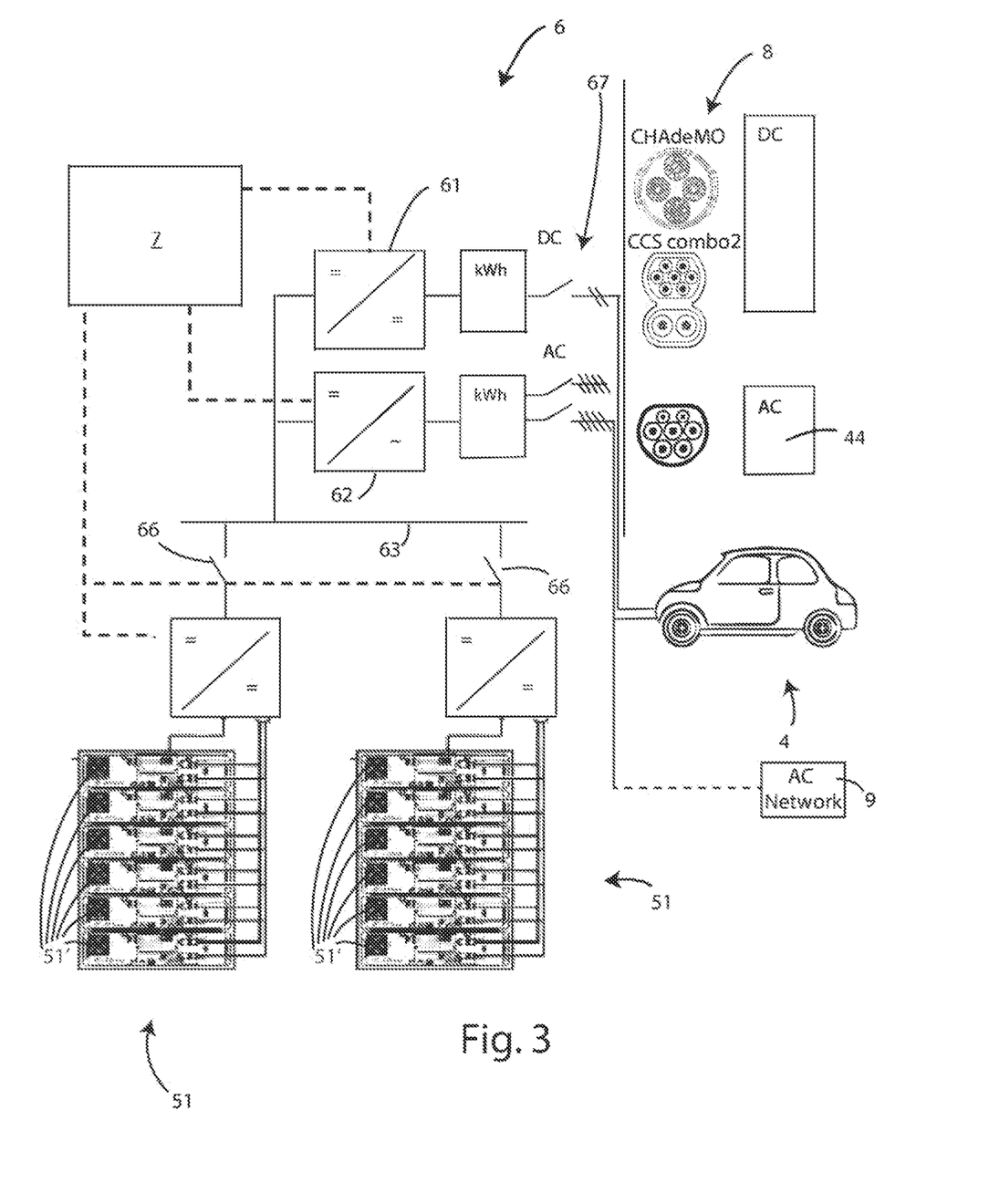
FIG. 3 shows the schematic wiring diagram of the power supply of the mobile charging system according to this invention.

With reference also to FIG. 3, the electrical layout of the inverter 6 is aimed at obtaining the maximum modularity and maximum flexibility of use while minimising weight and size.

To meet these objectives, the inverter 6 uses high-frequency switching technologies and comprises a direct current bus 63, which decouples the accumulators 51 from the charging part of the electric vehicle 4 side.

In particular, the connectors 8, which are connectable to the electric vehicle 4 to be supplied, are connected to said DC-DC converter 61 and to said DC-AC-DC converter 62, each connected to said direct current bus 63.

This configuration makes it possible, as mentioned, to reduce the weight and overall dimensions of the charging apparatus 3.

Under the mechanical profile, the accumulators 51 can be housed in a rack configuration, to allow easy maintenance, in addition to providing the possibility to increase the installed capacity in a simple way.

The switches 66 are envisaged between the bus 63 and the batteries 51, connected to and controlled by said internal control system 7.

The internal control system 7 is connected to said energy accumulation group 5 and said inverter 6, and comprises an interface panel 71, visible by means of a display, preferably a touch screen display (not shown in the figures) through which the user can easily manage and control the condition of the batteries and the operation of the charging apparatus 3 during the charging steps.

Said internal control system 7 is adapted to regulate the operation of said inverter 6, while charging external batteries and close or open said switches 66, to uncouple the accumulators 51 during the charging steps of the rechargeable batteries 41 of one or more vehicles 4.

The internal control system 7 also comprises an interface board 72, for detecting the charge state of the batteries of the electric vehicle 4 to be supplied, to take account of all the temperature information of the accumulators 51 of the charging apparatus 3 together with all the ventilation requirements. Said interface board is connectable to said electric vehicle 4 by means of a suitable cable 73.

With particular reference to FIG. 2, the connection of the mobile charging unit 1 connected to an electric vehicle 4 can be observed.

It should be considered that, in general, electric vehicles 4 normally comprise rechargeable batteries 41 for the accumulation of energy, equipped with their own detection board 42 of the operating states of the rechargeable batteries 41, to control the charge and discharge states, as well as any other operating variable of said rechargeable batteries 41.

Electric vehicles 4 also generally comprise a communication interface 43, to detect the charge state of the rechargeable batteries 41.

Said communication interface 43 is connectable to said interface board 72 of said internal control system 7 by means of said cable 73.

Electric vehicles 4 also generally comprise an AC-DC converter 44, connected to said rechargeable batteries 41, adapted to transform the output current from the inverter 4, and a DC-AC converter 47, interposed between the rechargeable batteries 41 and the motor 45 to be supplied.

The connectors 8 can be of different types, according to the standards of the prior art, according to which the charge should be carried out in direct current or alternating current.

In particular, in the case where it is necessary to charge in alternating current, the DC-AC converter of said inverter 6 is connected by means of a suitable connector 8 to the AC-DC converter, for enabling the charging of the rechargeable batteries 41.

Otherwise, the DC-DC converter 61 is directly connected to the rechargeable batteries 41, always with a specific connector 8.

The operation of the mobile charging unit 1 described above takes place in the following manner.

When the rechargeable batteries 41 of an electric vehicle 4 to be supplied are connected to the mobile charging system 3 by means of one of the connectors 8 and the interface board 72 of the internal control system 7, it is connected by means of the cable 73 to the communication interface 43 of the electric vehicle 4, the control system 1, acting as batteries-inverter coordinator, acquires the status information from the batteries board 42 and combines it with the variables needed for the proper operation of the inverter 6—rechargeable batteries 41 pair.

In general, the protocol for interfacing with the electric car or vehicle 4 to be charged depends on the charging method, such as:
- the method according to IEC 61851-1 for charging in three-step AC; and
- ChadeMo or CCScombo 2 protocol for charging in DC.

The charging system 3 controls the Pilot (CP) and Proximity Plug (PP) control signals.

The internal control system 7 is configured for:
- the detection of the connection of the protection conductor;
- the transmission and specification of the status of the electric vehicle 4 (vehicle connected, vehicle ready for charging in various steps, error);
- the transfer of information related to the maximum charging current available in the vehicle by means of, for example, a Pulse Width Modulation—PWM signal.

The control system 1 can integrate a communication system according to the OCPP—Open Charge Point Protocol, which is an open protocol for communication between the charging stations and a central management system of charging points (CPMS).

This allows any charging point producer to connect to the network, and for this reason has been chosen by the various manufacturers of charging stations to create their first network, accessible by all owners and builders of charging points, all grid operators and all drivers of plug-in electric vehicles.

As mentioned, the man-machine interface is made available via a colour touch screen display, built to be durable in harsh environments and for outdoor and automotive applications.

The interface panel 71 has the purpose of indicating key charging information to the user (kWh delivered, estimated charging end time, instantaneous power), the authorisation for the charge, buttons for charge start and stop, alarm visualisation, charge end—and cable removal enabled indication.

Furthermore, the charging and discharging of the accumulators 51 is monitored by the internal control system 7 and managed by the same in relation to the physical parameters being controlled, such as the voltages of the cells 51, which constitute said accumulators 51, and the temperature of the accumulators 51, in relation to the current variables and charging and discharging voltage.

With direct current (DC) charging, direct current is directly supplied to the rechargeable batteries 41 of the electric vehicle 4.

There are two different standards for charging in direct current: CHADEMO and CCS—Combined Charging System.

The charging system 3 is configured to manage both charging standards.

Figure 4:
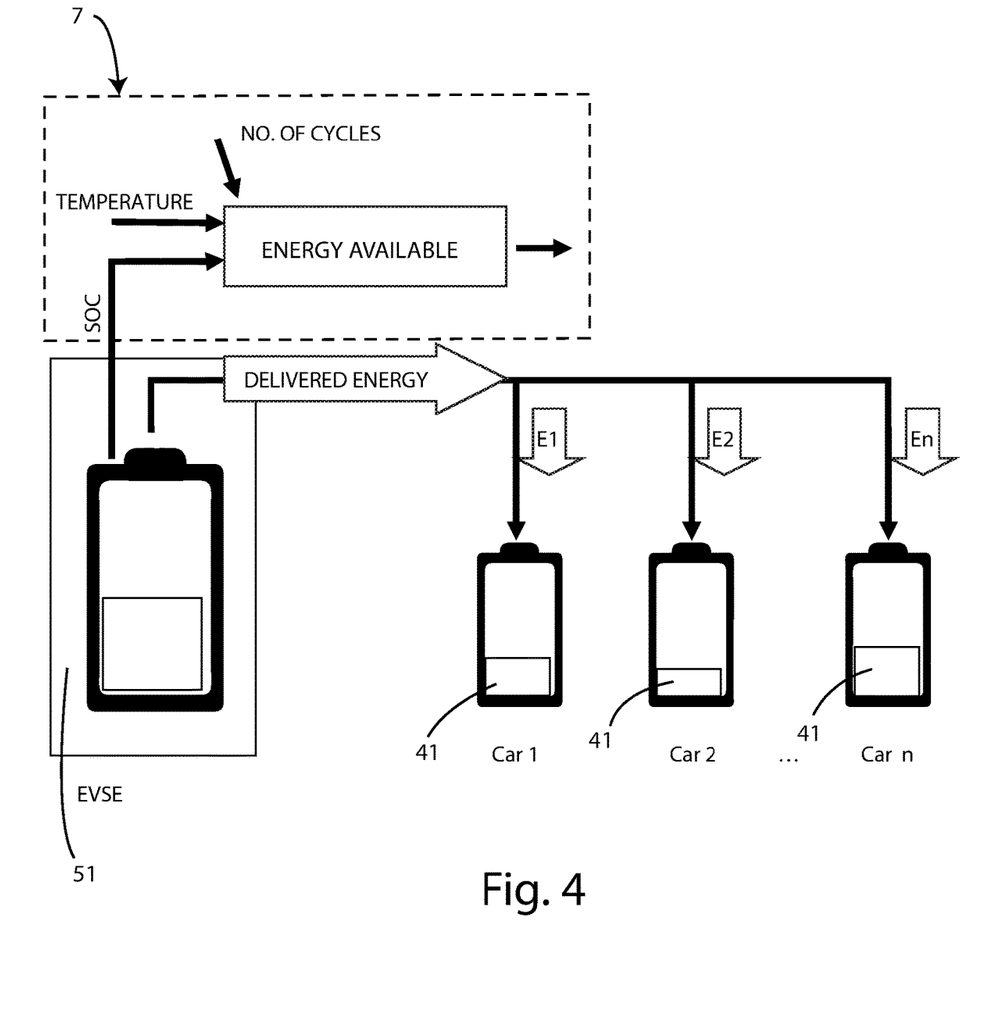
FIG. 4 shows a schematic diagram of charging a plurality of batteries.

Referring now to FIG. 4, a schematic view is shown of the connection between the accumulators 51 of said charging system 3, with a plurality of rechargeable batteries 41, each with a respective electric vehicle 4 to be charged.

The internal control system 7 allows detecting the energy available in the rechargeable batteries 41 in real time, as well as the energy delivered to each of the accumulators 41 of each electric vehicle 4 connected.

The internal control system 7 is also able to evaluate the available energy, taking into account any losses due to the effects of temperature and the number of charge and discharge cycles that the accumulators 51 have had.

In time, the accumulators 51 will be subject to charge cycles and discharge periods toward the vehicles 4 to serve.

The charging system 3 is characterised by the available power value (kW) and energy value (kWh).

The power of the accumulators 51 is sufficient for managing the charging of one or more vehicles 4, also simultaneously.

The internal control system 7 detects the energy that can be delivered in kWh in real time and determines if the amount of residual energy is sufficient for accepting further charges.

Figure 5:
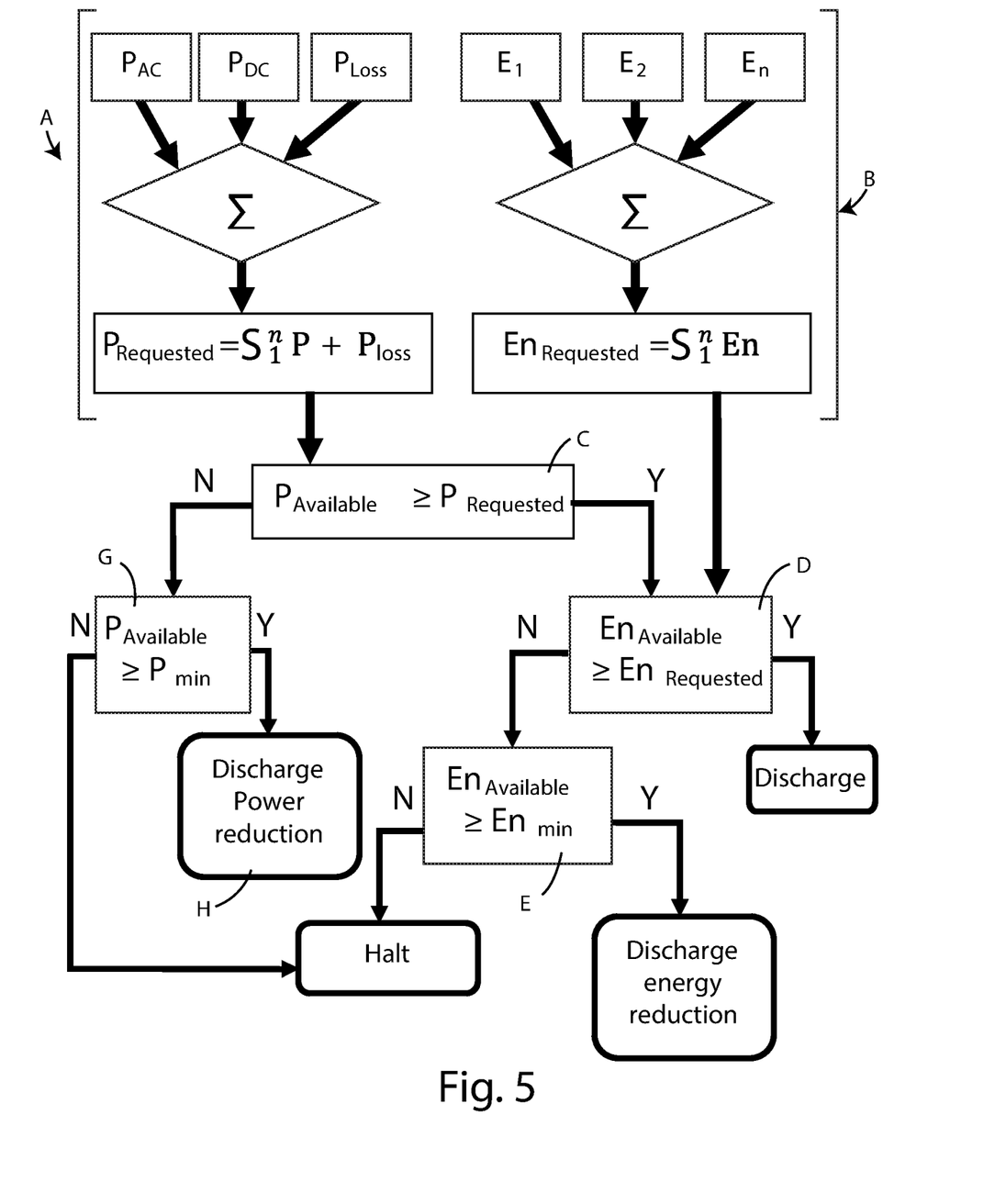
FIG. 5 shows a flow chart of the accumulated energy management method according to this invention.

In particular, the internal control system 7 performs the algorithm shown in FIG. 5, evaluating instant by instant the maximum available and deliverable power and the amount of residual energy. The algorithm also evaluates the need to return to the charging base and whether or not it is possible to propose and accept requests for simultaneous charging. The above-indicated algorithm comprises the following steps:

A. detect the requested power $P_{Requested}$ by the vehicles 4 whose rechargeable batteries 41 connected to said inverter 6 are to be charged, summing the power requested in alternating current $P_{AC}$, the power requested in direct current $P_{DC}$ and the leakage currents $P_{LOSS}$;

B. detect the energy $E_1, \ldots, E_n$ of each electric vehicle 4 requested for charging said rechargeable batteries 41 of the electric vehicles (4) connected to said inverter (6);

C. check if the available power $P_{Available}$ is greater than or equal to the requested power $P_{Requested}$;

D. if the available power $P_{Available}$ is greater than or equal to the requested power $P_{Requested}$, then check whether the available energy $E_{nAvailable}$ is greater than or equal to the energy requested, and thus perform a discharge step;

E. otherwise, if the available energy $E_{nAvailable}$ is greater than or equal to the minimum operating energy $E_{nMin}$ of the internal control system 7, then a discharge step to reduce energy is carried out;

F. otherwise the delivery of energy is stopped;

G. if in said step the requested power $P_{Requested}$ is not greater than the available power $P_{Available}$, check if the available power $P_{Available}$ is greater than the minimum operating power $P_{min}$ of the internal control system 7;

H. if the available power $P_{Available}$ is greater than or equal to the minimum power $P_{min}$, then a step of reducing the discharge power follows; and I. otherwise the delivery of energy is stopped.

Figure 6:
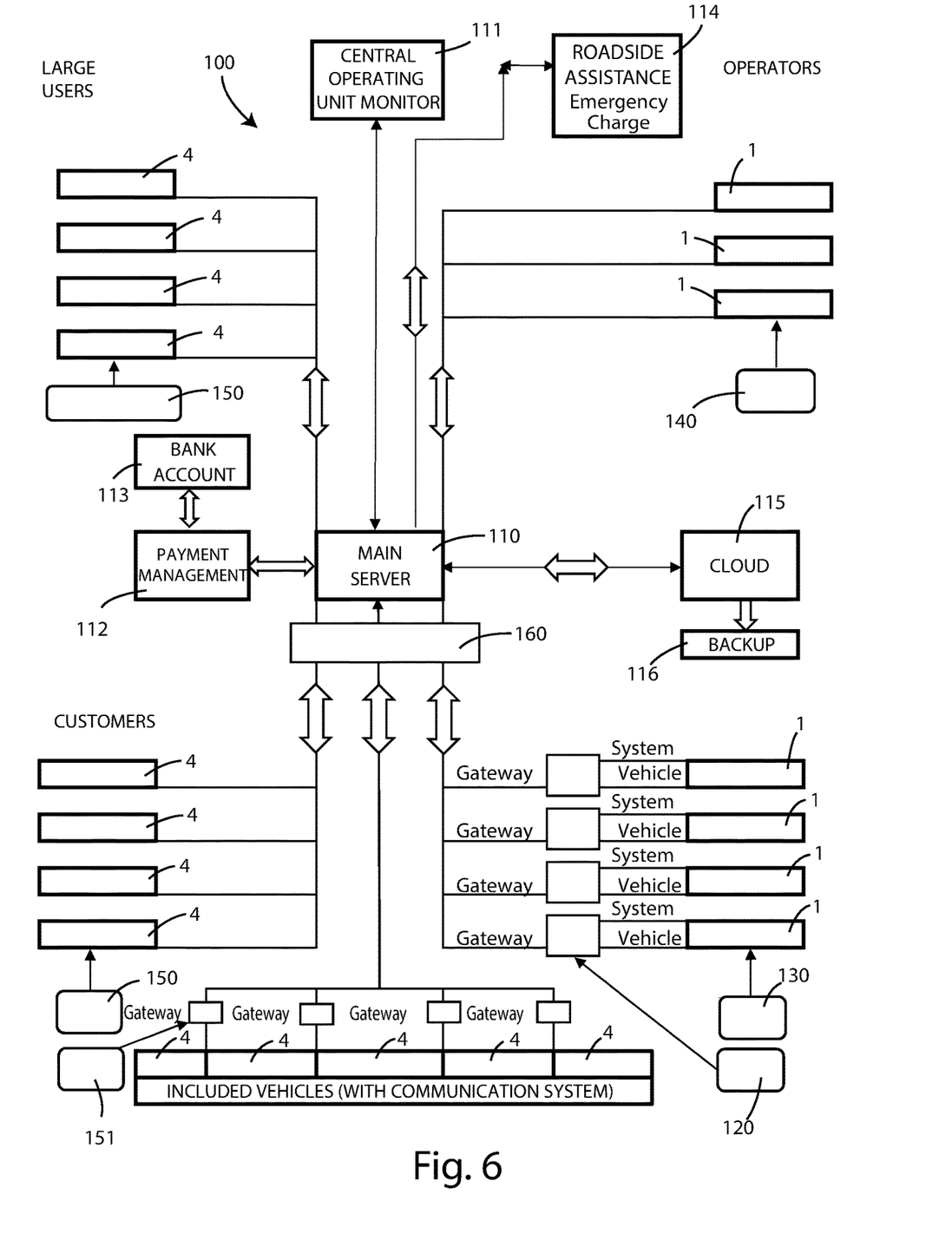
FIG. 6 shows a diagram of a management system for the delivery of charges and the mobile charging units according to this invention.

The mobile charging unit 1 and the charging apparatus 3 are integrated into an accumulated energy delivery management system and delivering charges on request, able to manage requests for the delivery of energy from different users, individuals or groups, as better described in the following.

In particular, the management system 100 comprises a main control server 110, to which a monitor 111 of the central operating unit is connected and a module for online payments 112, connectable to a bank 113.

The management system 100 also comprises a connection module 114 to roadside assistance, connected to said main control server 110.

The main control server 110 is connected to a cloud server 115, with a relative back-up module 116.

The management system 100 also includes a data collection control unit 120 for collecting data from the charging vehicles 2 of the mobile charging units 1, connected to said main control server 110, a charging system data collection control unit 130, always of the mobile charging units 1, and a plurality of service peripherals 140, such as smartphones or tablets, each associated to the driver of the charging vehicles 2 of the mobile charging units 1 of the management system 100, on which the charging apparatuses 3 are installed.

The management system 100 thus comprises a plurality of access peripherals 150 associated with the users interested in charging, each therefore relating to an electric vehicle 4, such as smartphones and the like, suitably programmed or equipped with a specific APP, and any user vehicle data control units 151, intended for the data connection with said main control server 110.

These access peripherals 150, i.e. said user data control units 151, can be associated either with a single user or with groups of users (or grouped users, for example for large customers with a fleet of electric vehicles 4).

Furthermore, in each specific area the management system 100 also provides a local area computer for the management of charges in that place or area. These local computers are indicated with the reference number 160 and are connected to the main control server 110 for recording the relative data.

The management system 100 makes it possible to perform, through the various terminals indicated above, and in particular by means of the main control server 110 and relative modules, the service peripherals 140 and access peripherals 150, different operating steps for the charging service delivery by means of the mobile charging units 1, such as:
  integrate an order, customer and payment management system;
  integrate and manage order requests;
  allow for the user/customer interface for smartphones and tablets for the generation of requests/orders;
  allow for the interface of large customer users per PC for order requests for fleets of vehicles;
  allow for the interface of the drivers of the mobile charging units 1 to define and manage the missions;
  collect data and geolocalise the mobile charging units 1;
  collect data and geolocalise the electric vehicles 4 of the users to be charged.

Figure 7:
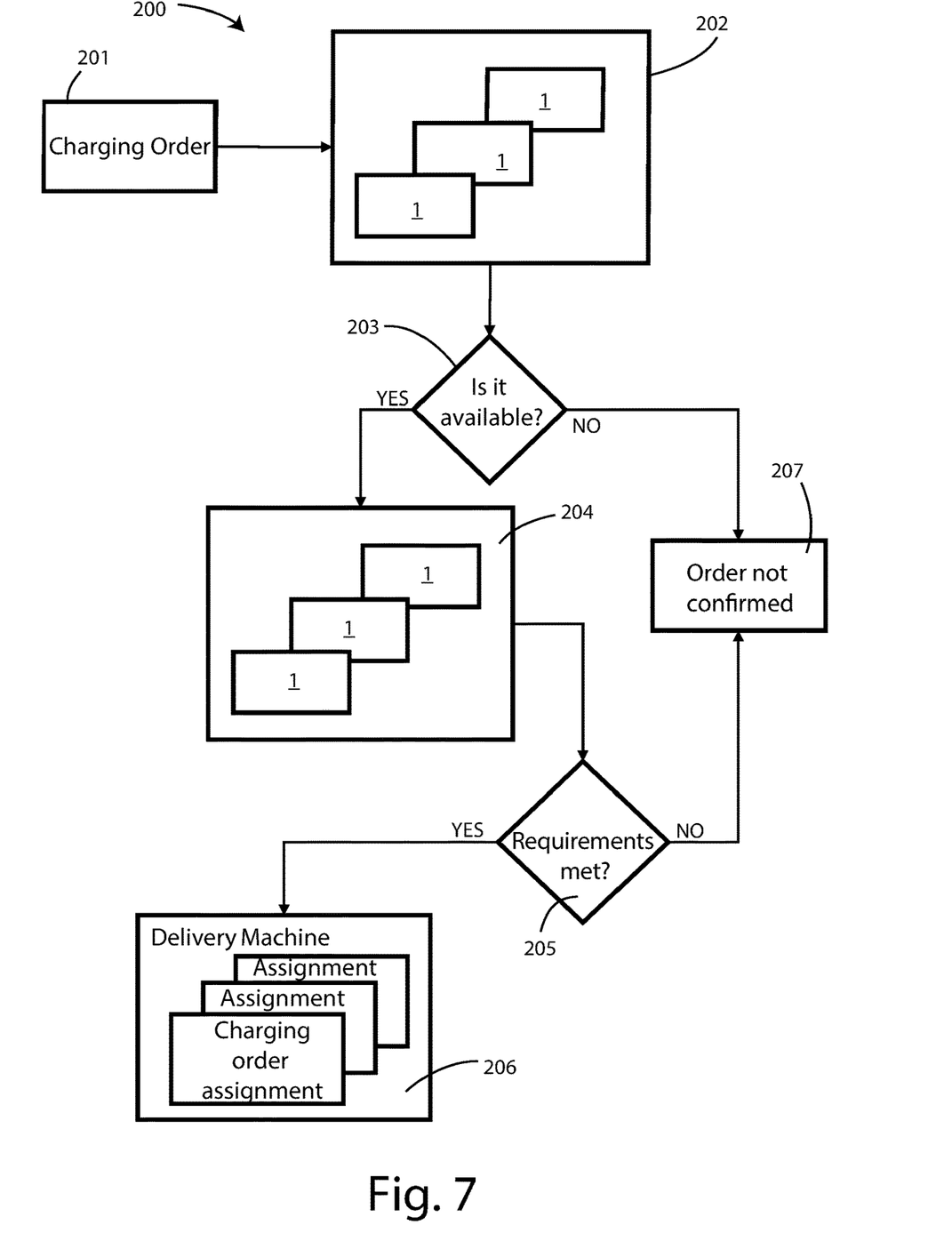
FIG. 7 shows a block diagram of the operational method of the management system for the delivery of charges from the system according to FIG. 6.

The combination of these functions and their mutual connection to the management system 100 is shown in FIG. 7 and is better explained in the following.

Under an IT profile, the main control server 110, the service peripherals 140 and the access peripherals 150 and/or the user vehicle data control units 151, install communications software which is appropriately coordinated between them.

In particular, the coordination of the entire management system 100 is carried out by the method shown in the flow chart 200 shown in FIG. 7, mainly managed by said main control server 110.

In particular, the management system 100 envisages that the main control server 110 receives a charging order in step 201, issued by the APP installed on an access peripheral 150 or the user vehicle data control units 151, which have been pre-programmed beforehand.

In particular, each user vehicle data control unit 151 is directly or indirectly operatively connected to the detection board 42 of the respective electric vehicle 4.

Said user vehicle data control unit 151 is programmed such to detect the charge state of the rechargeable batteries 41 of the electric vehicle 4 and send a charging order when said charge state of said rechargeable batteries 41 falls below a predefined threshold.

Each charging order from an electric vehicle 4 is geolocalised, always by means of the access peripheral 150 (or the user vehicle data control units 151), which makes the charging order.

The charge request from a vehicle 2 that transports the charging apparatuses 3 is received by users and/or by large users.

Knowing the charge state of the charging apparatuses 3 of the vehicles 2 for transporting the charging systems and knowing the position of the customers who have made the request (in the step of issuing the charging order 201), as well as the position of the vehicles 2 with the respective charging apparatus 3 on board, through an appropriate optimisation algorithm, said main control unit 110 decides which charging vehicle 2 and in what moment to issue the request for the execution of the charging order.

In particular, it is checked that the charging vehicle 2 presents an amount of charge in the accumulators 51 which is sufficient to meet the requirements of the requesting electric vehicle 4.

Then it is also verified whether the charging vehicle has its own sufficient electric charge available to reach the electric vehicle 4 to be charged and to return to the charging base.

The urgency of the request from the users of the electric vehicles 4 is also managed. Accordingly, the charging time is also estimated, which as is well known, is highly variable in terms of time. This implies that the management system 100 should envisage compensations in cost using the online payments module 112, in case of any problem in the actual charging steps.

Finally, the time taken for the work of the operators of the charging vehicles 2 is taken into account.

On the basis of the above, the computer program executed by said main control unit 110 shall take account of the following variables:
  A. the state of all the available charging apparatuses 3;
  B. the charge state of all charging vehicles 2 transporting said charging apparatuses 3;
  C. the position of the charging vehicles 2 carrying the charging apparatuses 3 (latitude and longitude in decimal degrees/GMS degrees, minutes, seconds);
  D. the position of the electric vehicles 4 to be charged (latitude and longitude in decimal degrees/GMS degrees, minutes, seconds);
  E. the traffic at the time of the order's sending;
  F. the time requested by the customer for carrying out the charge;
  G. the service status reached by the vehicles 2 with the charging apparatuses 3 on board (working hours remaining), and therefore the availability of residual time to carry out the delivery of the charging order.

The main control server 110, on the basis of the above variables, determines which mobile charging vehicle 2 is in service and which charging apparatus 3 is most suited to carrying out the charge mission or request and therefore to execute the requested order.

In particular, said main control server 110, by means of the computer processing program installed in the same, defines the timing of deliveries and the state of progress of the orders received by any users using the access peripherals 150, on which the appropriate APP is installed.

Always through the procedure described in FIG. 7, it is possible to define which charging apparatus 3, and therefore which charging vehicle 2, must return to a competent station to charge.

Furthermore, through the process shown in FIG. 7, the main control unit 110 provides, where possible, the opening control of the access flap to the charging sockets/charging pins of the users' vehicles.

The procedure shown in FIG. 7 makes it possible to continuously monitor all variables to promptly decide how to define and assign the missions.

In particular, referring to FIG. 7, said procedure comprises the following steps:

request in step 201, by the user or large user, an electrical charge of an electric vehicle 4 via the program or APP installed in the respective terminal 150. During this step, the electric vehicle 4, or better the terminal 150 with which the order is issued, is geolocalised by said main control server 110;

said main control server 110, in step 202, processes the order, i.e. performs the selection of a mobile charging unit 1, taking into account the variables that it receives from the vehicles 2 carrying said charging apparatus 3. Since the main control server 110 receives the position of the vehicles 2 carrying the charging apparatuses 3 of the charging system itself, acquired through the peripheral terminals associated with the drivers of the vehicles 2 and electric vehicles 4, the traffic conditions, the positions of the customer's vehicle, thanks to the evaluation or determination of the geographical position of each charging vehicle 2 and the electric vehicles 4 to be charged, the optimal route is chosen for each charging order. Always in said step 202, the charge of the various charging vehicles 2 is checked;

in step 203, the availability of the chosen charging vehicle 2 is checked in order to verify if it is able to reach the customer within the requested time;

if the charging vehicle 2 is available, in step 204 the charge state (in kWh) of the charging apparatus 3 installed on the identified available charging vehicle 2 is assessed. Moreover, the availability (working hours remaining) of the driver of the identified available charging vehicle 2 is detected, determining and taking account also of the sufficient autonomy (in kWh and hours) to subsequently return to the station;

in step 205 a check is performed to verify whether all the requirements have been met and the system 100, in particular the main control unit 110 decides which charging vehicle 2, with respect to the request received, is capable of delivering the charge;

in step 206, the assignment of the order is carried out. In particular, the main control unit 110, on the basis of the geographical position of the request(s) received by one or more access peripherals 150, calculates the optimal route (for distances and traffic conditions), kWh and autonomy, residual working hours, and decides to which system and when (on the basis of requests received up to that moment) to issue the request for the execution of the charging order;

in the case in which in the above steps 203 and 205 there are respectively no charging vehicles 2 available, i.e. the necessary requirements have not been met, the order would not be confirmed (step 207).

Furthermore, in a preferred embodiment the management system 100 provides for the creation of a data-log where all the variables for self-learning improvement data for future missions are recorded.

An advantage of this invention is that it also allows the simultaneous charging of different mobile vehicles.

There is also an advantage in the inverter—direct current bus scheme, that is, it allows for a high charging speed of the electric vehicle served, as well as to have a high degree of compactness, thereby allowing the creation of a mobile charging service, in consideration of the shortage of fixed charging columns.

This invention has been described for illustrative, but not limiting purposes according to its preferred embodiments, but it should be understood that variations and/or modifications can be made by those skilled in the art without departing from the relative scope of protection, as defined by the appended claims.

The invention claimed is:

1. A mobile charging unit (1), particularly for one or more electric vehicles (4), of the type including rechargeable batteries (41), comprising:
   a mobile charging vehicle (2), and
   a charging apparatus (3), installed on said charging vehicle (2), having, in turn:
      an energy accumulation group (5), equipped with accumulators (51) for storing energy for charging said electric vehicles (4);
      an inverter unit (6), connected to said accumulators (51), comprising a DC-AC-DC converter (62), for converting the direct current from said accumulators (51) into alternating current, wherein said inverter unit (6) is connectable to an alternating-current network (9) and is adapted to transform the alternating current of said alternating-current network (9) into direct current for charging said accumulators (51); and
      an internal control system (7), connected to said inverter unit (6), adapted to control the operation of said inverter unit (6);
   wherein said inverter unit (6) further comprises:
   a direct current bus (63), connected to said DC-AC-DC converter (62), and
   a DC-DC converter (61), from direct current into direct current, connected to said direct current bus (63) and connectable to the rechargeable batteries (41) of said vehicle (4),
   wherein said DC-DC converter (61) and said DC-AC-DC converter (62) comprise a switch (67) respectively, the switch (67) of the DC-AC-DC converter (62) connecting the DC-AC-DC converter (62) to said alternating-current network (9) and to said vehicle (4), and the switch (67) of the DC-DC converter (61) connecting the DC-DC converter (61) to said vehicle (4),
   wherein said accumulators (51) are connected to said direct current bus (63);
   wherein said inverter unit (6) comprises one or more switches (66), interposed between said direct current bus (63) and said accumulators (51), said switches (66) being connected to said internal control system (7); and
   wherein said internal control system (7) is adapted to regulate the operation of said inverter (6), while charging external batteries and close or open said switches (66), to uncouple the accumulators (51) during the charging steps of the rechargeable batteries (41) of one or more vehicles (4).

2. The mobile charging unit (1) according to claim 1, wherein said internal control system (7) comprises:
   an interface panel (71) that can be seen by a display, preferably a touch screen display, to highlight charging parameters, and
   an interface board (72), intended to be connected, by means of a cable (73), to an analogous communication interface board (43) of said electric vehicle (4) whose rechargeable batteries (41) must be charged, for detecting the charge state of said rechargeable batteries (41), said interface board (72) being adapted to detect operational information of said charging apparatus (3), including: information relating to the electric charge and the temperature of said accumulators (51) and related to the thermal and operating condition of said inverter unit (6).

3. The mobile charging unit (1) according to claim 1, wherein said accumulators (51) are arranged in a rack configuration.

4. The mobile charging unit (1) according to claim 1, further comprising a detection board (52) for the detection of the charge and discharge states of said accumulators (51), said detection board (52) being connected to said internal control system (7) and being configured to provide operating variables of said accumulators (51) to said internal control system (7).

5. The mobile charging unit (1) according to claim 1, further comprising connectors (8) for connecting said inverter unit (6) to said rechargeable batteries (41) of said vehicle (4).

\* \* \* \* \*